United States Patent
Letscher et al.

(10) Patent No.: US 10,807,410 B2
(45) Date of Patent: Oct. 20, 2020

(54) ADD-ON WHEEL WEIGHT FOR A VEHICLE

(71) Applicant: DEERE & COMPANY, Moline, IL (US)

(72) Inventors: Jens Letscher, Ludwigshafen (DE); Jana Suttrup, Coesfeld (DE)

(73) Assignee: DEERE & COMPANY, Moline, IL (US)

( * ) Notice: Subject to any disclaimer, the term of this patent is extended or adjusted under 35 U.S.C. 154(b) by 249 days.

(21) Appl. No.: 15/938,430

(22) Filed: Mar. 28, 2018

(65) Prior Publication Data
US 2018/0281512 A1 Oct. 4, 2018

(51) Int. Cl.
*B60B 15/28* (2006.01)
*B62D 49/06* (2006.01)
*B62D 49/08* (2006.01)
*F16B 21/02* (2006.01)

(52) U.S. Cl.
CPC .......... *B60B 15/28* (2013.01); *B62D 49/0628* (2013.01); *B62D 49/085* (2013.01); *F16B 21/02* (2013.01)

(58) Field of Classification Search
CPC ..................................................... B60B 15/28
See application file for complete search history.

(56) References Cited

U.S. PATENT DOCUMENTS

| | | | | |
|---|---|---|---|---|
| 2,859,065 A * | 11/1958 | Darby | ..................... | B60B 15/28 301/53.5 |
| 2,988,401 A * | 6/1961 | Matz | ....................... | B60B 15/28 301/53.5 |
| 3,644,002 A * | 2/1972 | Barth | ...................... | B60B 15/28 301/53.5 |
| 4,400,038 A | 8/1983 | Hosokawa | | |
| 5,873,636 A | 2/1999 | Messina et al. | | |
| 6,283,556 B1 * | 9/2001 | Taylor | ..................... | B60B 15/28 301/53.5 |
| 7,182,409 B2 * | 2/2007 | Thomas | .................. | B60B 15/28 301/53.5 |
| 10,457,092 B2 * | 10/2019 | Bhosale | .................. | B60B 15/28 |
| 2005/0280308 A1 | 12/2005 | Thomas et al. | | |
| 2013/0342002 A1 | 12/2013 | Roth et al. | | |
| 2018/0345721 A1* | 12/2018 | Letscher | ................. | B60B 15/28 |

FOREIGN PATENT DOCUMENTS

DE 1279496 B 10/1968
DE 102014202074 A1 8/2015

OTHER PUBLICATIONS

European Search Report issued in counterpart application No. 18163289.4 dated Sep. 6, 2018. (7 pages).
German Search Report issued in counterpart application No. 102017205465.4 dated Nov. 29, 2017. (10 pages).

* cited by examiner

*Primary Examiner* — Jason R Bellinger

(57) ABSTRACT

An add-on wheel weight for a work machine that includes a weight disc and a mounting configured to attach to a wheel rim. The weight disc includes a closure mechanism that may be actuated manually or by outside force. The closure mechanism has an axially running guide opening configured to receive a coupling element associated with the mounting and has a releasable locking element for latching the coupling element inside the guide opening.

16 Claims, 6 Drawing Sheets

ADD-ON WHEEL WEIGHT FOR A VEHICLE

RELATED APPLICATIONS

This application claims priority to German Application Ser. No. 102017205465.4, filed Mar. 30, 2017, which is hereby expressly incorporated in its entirety.

FIELD OF THE DISCLOSURE

The present disclosure relates to an add-on wheel weight for a vehicle, and in particular, to an add-on wheel having a weight disc and a mounting attachable to a wheel in order to fasten the weight disc.

BACKGROUND

A conventional add-on wheel weight for ballasting a drive axle of an agricultural tractor is described in DE 10 2014 202 074 A1, for example. The add-on wheel weight includes an adapter plate that can be fastened to a wheel by means of a bolting plate and a weight disc that can be attached to the adapter plate. To simplify the correct positioning of the weight disc, a plurality of interlocking conical contact surfaces or coding formations and spacer domes are provided. The final installation is accomplished by means of conventional threaded bolts.

SUMMARY

In this disclosure, the add-on wheel weight for a vehicle includes a weight disc and a mounting attachable to a wheel for fastening the weight disc. The weight disc further includes a closure mechanism that may be actuated manually or by outside force, having an axially running guide opening for receiving a coupling element associated with the mounting and having a releasable locking element for latching the coupling element inside the guide opening. External force actuation of the closure mechanism may be accomplished by means of an electric motor drive or the like.

An especially secure and comfortable attachment of the add-on wheel weight is possible because during mounting or pushing the weight disc onto the wheel, the weight disc, usually weighing several hundreds of kilograms, may be supported on the coupling element, which is guided axially inside the guide opening, and the weight disc may be latched therein by the locking element at the same time. For a harvesting machine, a forage harvester, or an agricultural utility vehicle designed as an agricultural tractor, corresponding add-on wheel weights may be provided on the front wheels, the rear wheels, or both the front and the rear wheels.

Axial alignment of the guide opening is to be understood in this context as that direction which corresponds to the axial extent of the wheel equipped with or to be equipped with the add-on wheel weight.

The locking element may have a blocking contour protruding into the guide opening to latch the coupling element in a locked position. The blocking contour may form a contact surface for the coupling element axially inside the guide opening, wherein the contact surface of the coupling element, at least in part, surrounds or reaches behind the coupling element in the removal direction when the locking element is in the locked position. The coupling element may be a coupling ball, in which case the blocking contour has a profile matching the ball surface. Other locking contours are also possible, however, which are suitable for latching a coupling head contained by the coupling element.

According to a first embodiment of the add-on wheel weight, the blocking contour may be formed on a displaceable locking pin or a pawl, wherein the locking pin or the pawl is pushed into the locked position by the action of a return spring. From this, a self-securing closure mechanism is formed, which reliably excludes undesired detachment due to, for example, driving-induced vibrations.

In particular, the locking pin or the locking pawl may be brought into an unlocked position, releasing the coupling element against the force of the return spring by means of an actuating lever. The spring constant of the return spring may be dimensioned or selected such that, in addition to maintaining a reliable securing effect, swiveling of the actuating lever by hand is possible without problems, specifically without tools.

It is additionally possible for the locking pin or the locking pawl to form, together with the return spring, a snap closure for automatic latching of the coupling element, the snap closure being releasable by means of the actuating lever. In this case, the locking pin or the locking pawl is pushed along or pushed aside by the coupling element, which opens the guide opening, while the weight disc is being pushed on. When the coupling element reaches its mounted position inside the guide opening, the locking pin or locking pawl may return on its own into the latching position in order to secure the coupling element. The snap closure constitutes an additional increase of comfort for the user, because no additional manipulations are necessary for mounting the weight disc. In particular, the weight disc does not need to be released in the unmounted state to attach separate securing elements such as threaded bolts or the like.

According to a second embodiment of the add-on wheel weight, the blocking contour may be formed on a pivotably mounted actuating lever. The coupling element in this embodiment may be formed as a coupling ball, the blocking contour having a spherical profile that may be oriented about a pivot axis aligned with the center of the coupling ball situated in the guide opening.

Furthermore, the possibility exists for the blocking contour to run eccentrically in relation to the pivot axis of the actuating lever in such a manner that the coupling ball may be clamped in the locked position inside the guide opening, so that a tolerance-induced clearance between the coupling ball and the guide opening may be compensated.

Additionally, the add-on wheel weight may include a securing element for releasable fixation of the actuating lever in the locked position. The securing element may have a securing tab formed on the weight disc, which tab extends through an opening formed in the actuating lever if the lever is in the locked position. To secure the actuating lever, a cotter pin may be pushed through the securing tab in such a manner that the actuating lever may be blocked from swiveling out of the locked position.

In order to inhibit an undesired release of the closure mechanism, it is possible for the actuating lever to lock into a recess contained by the weight disc such that the actuating lever may be substantially surface-flush with the weight disc in the locked position. Accordingly, the actuating lever may be manually unfolded out of the recess to release the coupling ball, but unintentional unfolding out of the recess due to rubbing against undergrowth is largely excluded.

It is additionally possible to provide a tensioning element for establishing a frictional connection between the mounting and the weight disc. The tensioning element may be designed in the form of a disc spring arranged between the mounting and the weight disc. The disc spring may be pushed onto a fastening base formed on the coupling ball. When the weight disc is pushed on, the disc spring is compressed relative to the mounting, so that undesired driving-induced movements between weight disc and mounting are dampened.

The weight disc may have multiple closure mechanisms in radially opposing positions, so that secure fastening of the weight disc on the mounting is guaranteed. If two closure mechanisms are provided, a single person may be capable of operating or actuating them with both hands.

In order to relieve the closure mechanism of driving-induced torsional forces on the weight disc, the mounting may have a plurality of protrusions engaging form-fittingly with corresponding receiving openings. Such torsional forces occur particularly while braking or accelerating, due to the changing wheel speeds of the vehicle.

The mounting may have a hollow cylindrical main body and a circumferential fastening flange for attachment to a wheel. When mounted on the wheel, the hollow cylindrical main body may also be used for mechanical protection of a wheel final drive housing. Such a wheel final drive housing with a step-down gear mechanism may be provided on the front wheels for agricultural tractors with all-wheel drive. The fastening flange may be formed as a bolting plate for fastening to a mating flange of the wheel.

Additionally, the weight disc may have a central opening for form-fittingly receiving the mounting, in particular a hollow cylindrical main body comprised thereby. In this case the entire weight of the wheel disc may be supported radially on the mounting to prevent undesired shear forces acting on the closure mechanism.

The mounting may also have axially running sliding ribs along the hollow cylindrical main body. This leads to a corresponding reduction of the contact surface area and thus the friction between the weight disc and the mounting, so that the weight disc may be positioned more easily relative to the mounting during installation.

If an additional increase of weight is desired, it is possible for the weight disc to comprise a coupling element for attaching an additional weight disc.

Cutouts for receiving a loader fork or a cable hoist may also be formed on the weight disc for easier handling. Thereby the weight disc may be raised by a front loader or by a cable hoist such that the central opening provided in the weight disc is aligned with the mounting, and thus the weight disc may be pushed on without problems.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
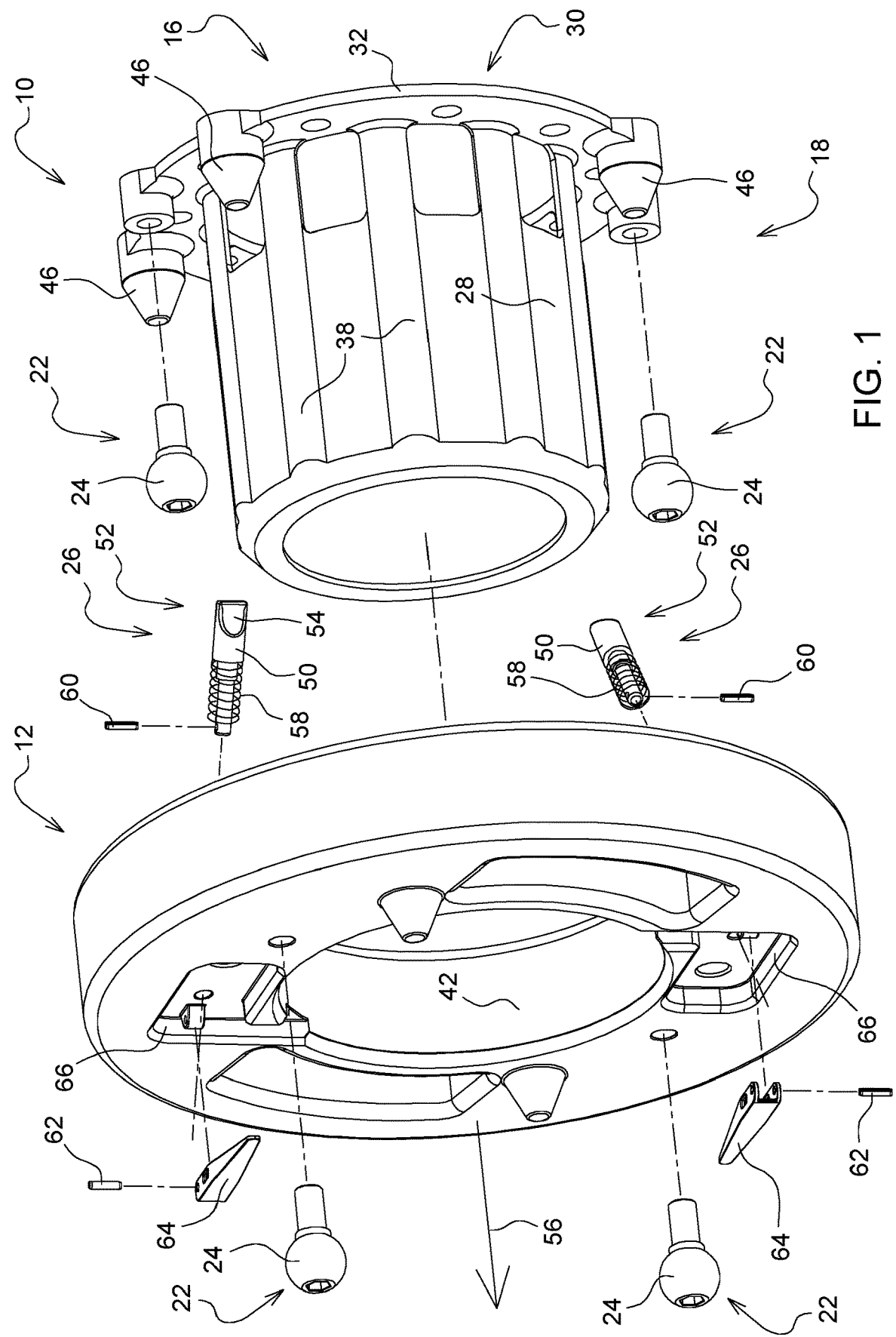
FIG. 1 is an exploded view of a first embodiment of the add-on wheel weight according to the disclosure, comprising a single weight disc and a mounting attachable to a wheel.

FIG. 1 shows an exploded view of a first embodiment of the add-on wheel weight according to the disclosure for a work vehicle. The wheel disc will be described below with reference to the two cross-sectional representations according to FIG. 2 or FIG. 3.

The add-on wheel weight 10 comprises a weight disc 12 and a mounting 16 attachable to a wheel 14 for fastening the weight disc 12. The weight disc 12 further comprises a first and a second closure mechanism 18 that may be actuated manually, each having an axially running guide opening 20 for receiving a coupling element 22 in the form of an exchangeable coupling ball 24 associated with the mounting and having a releasable locking element 26 for latching the coupling ball 24 inside the guide opening 20. The first and the second closure mechanisms 18 may be arranged in radially opposing positions of the weight disc 12.

Figure 2:
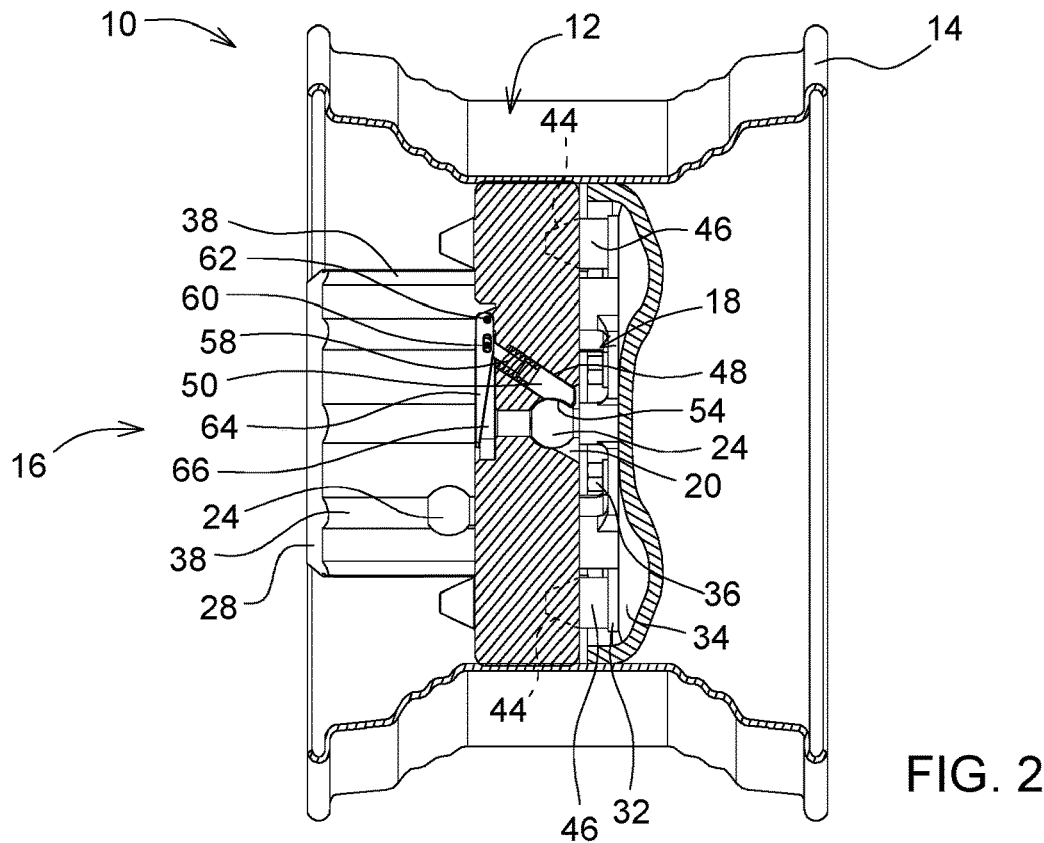
FIG. 2 is a cross-sectional representation of the add-on wheel weight shown in FIG. 1 in the mounted state.
Figure 3:
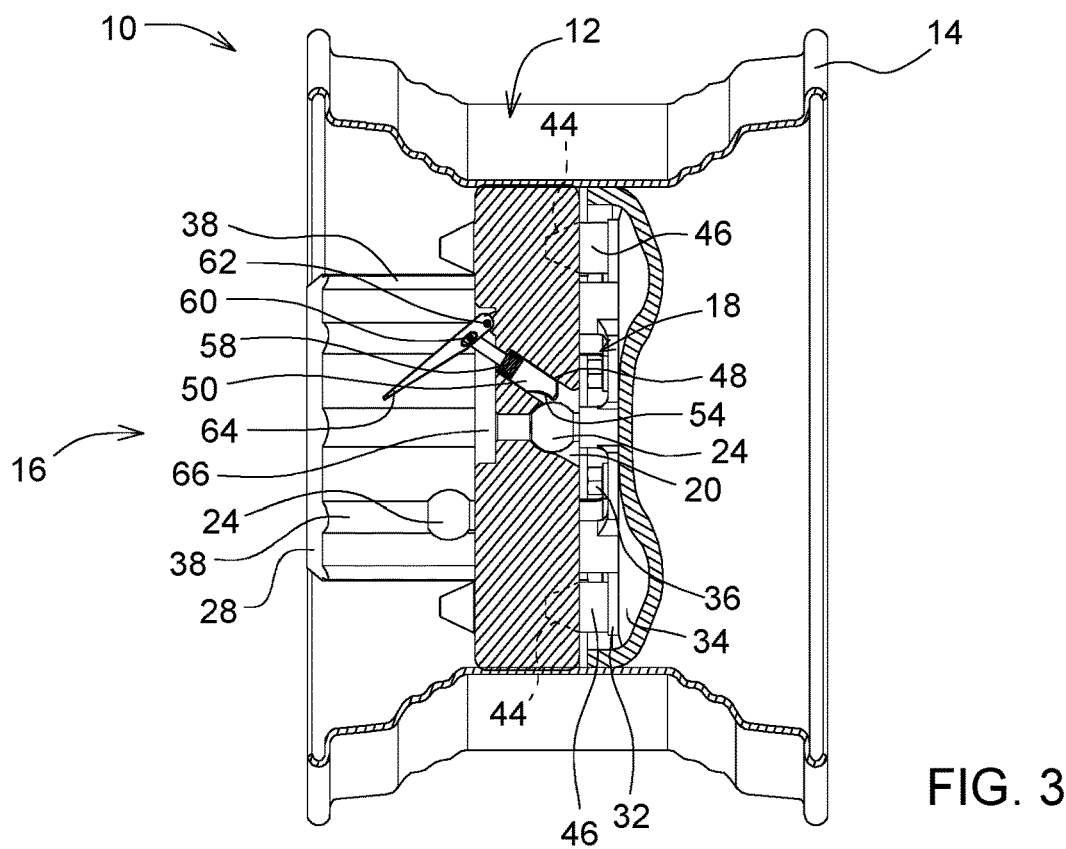
FIG. 3 is a cross-sectional view of the add-on wheel weight shown in FIG. 1 during installation.

The design of the guide opening 20 is reproduced in FIG. 2 and FIG. 3, wherein the guide opening 20 tapers down toward the inside to simplify the centering of the coupling ball 24 relative to the guide opening 20 during installation of the weight disc 12 on the mounting 16.

The mounting 16 has a hollow cylindrical main body 28 and a circumferential fastening flange 30 for attachment to a wheel 14, wherein the fastening flange 30 is constructed as a bolting plate 32 for fastening to a mating flange 34 of the wheel 14. The fastening is accomplished by means of associated threaded bolts 36.

Axially running sliding ribs 38 may be formed on the mounting 16 along the hollow cylindrical main body 28.

Figure 4:
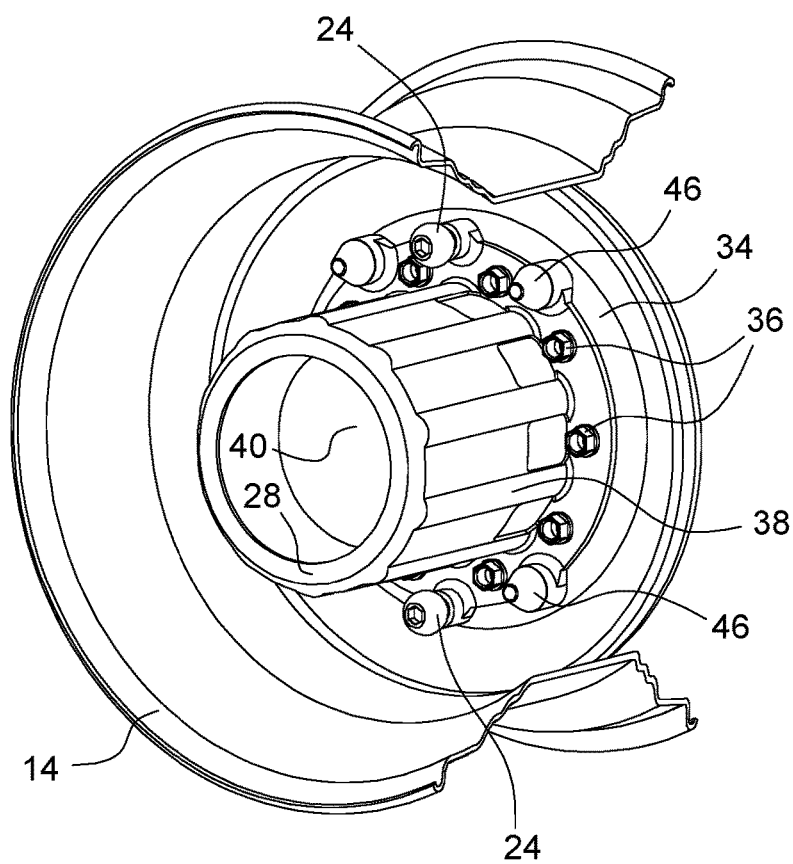
FIG. 4 is a perspective view of the add-on wheel weight shown in FIG. 3 with the weight disc removed.

According to the first embodiment, the hollow cylindrical main body 28 may also be used, when mounted on the wheel 14, for mechanical protection of a wheel final drive housing 40, illustrated in FIG. 4. The wheel final drive housing 40 accommodates a step-down gear mechanism of the type provided on the front wheels for agricultural tractors with all-wheel drive. Use of the add-on wheel weight 10 is not limited to agricultural tractors, but it may also be used for any other work vehicle such as harvesting machines or forage harvesters.

The weight disc 12 may have a central opening 42 for form-fittingly receiving the mounting 16, or more precisely, the hollow cylindrical main body 28 comprised thereby.

The add-on wheel weight 10 is installed by pushing the weight disc 12 axially onto the mounting 16 or the hollow cylindrical main body 28 comprised thereby. By rotating the weight disc 12, the guide openings 20 may be aligned relative to the coupling balls 24 of the mounting 16 such that the coupling balls 24 may be engaged by pushing the disc further onto the mounting 16. Further, the weight disc 12 may be latched by means of the closure mechanism 18.

To relieve the closure mechanism 18 from driving-induced torsional forces acting on the weight disc 12, the mounting 16 has multiple protrusions 46 that engage form-fittingly with corresponding receiving openings 44. Such torsional forces occur particularly while braking or accelerating, due to the changing wheel speeds of the agricultural utility vehicle.

The locking element 26 may be a displaceable locking pin 50 inside a bore 48, wherein a blocking contour 54 may be formed on the locking pin 50 in an end region 52 facing the guide opening 20 and having a spherical contour corresponding to the ball surface.

As shown in FIG. 3, the blocking contour 54 forms a contact surface for the coupling ball 24 present in the guide opening 20, wherein the contact surface, at least in part, surrounds or reaches behind the coupling ball 24 in the removal direction 56 when the locking pin 50 is in the locked position shown in FIG. 3.

It is provided that the locking pin 50 may be brought against the force of a return spring 58 out of the locked position and into an unlocked position, releasing the coupling ball 24 by means of an actuating lever 64 articulated by associated fastening pins 60, 62. The locked position is shown in FIG. 2. The spring constant of the return spring 58 is dimensioned or selected such that the return spring 58 maintains a reliable securing effect and enables manual swiveling of the actuating lever 64 without tools.

To inhibit an undesired release of the closure mechanism 18, the actuating lever 64 may be held substantially flush in a recess 66 comprised by the weight disc 12 when in the locked position, wherein the actuating lever 64 may be manually unfolded out of the recess 66 to release the coupling ball 24.

Together with the return spring 58, the locking pin 50 forms a snap closure for automatic latching of the coupling ball 24 that may be released by means of the actuating lever 64. In this embodiment, the locking pin 50 may be pushed along or pushed aside by the coupling ball 24, which releases the guide opening 20 while the weight disc 12 is being pushed on. When the coupling ball 24 reaches its mounted position, shown in FIG. 3, inside the guide opening 20 the locking pin 50 may return on its own to the locked position, according to FIG. 2, to secure the coupling ball 24.

Figure 5:
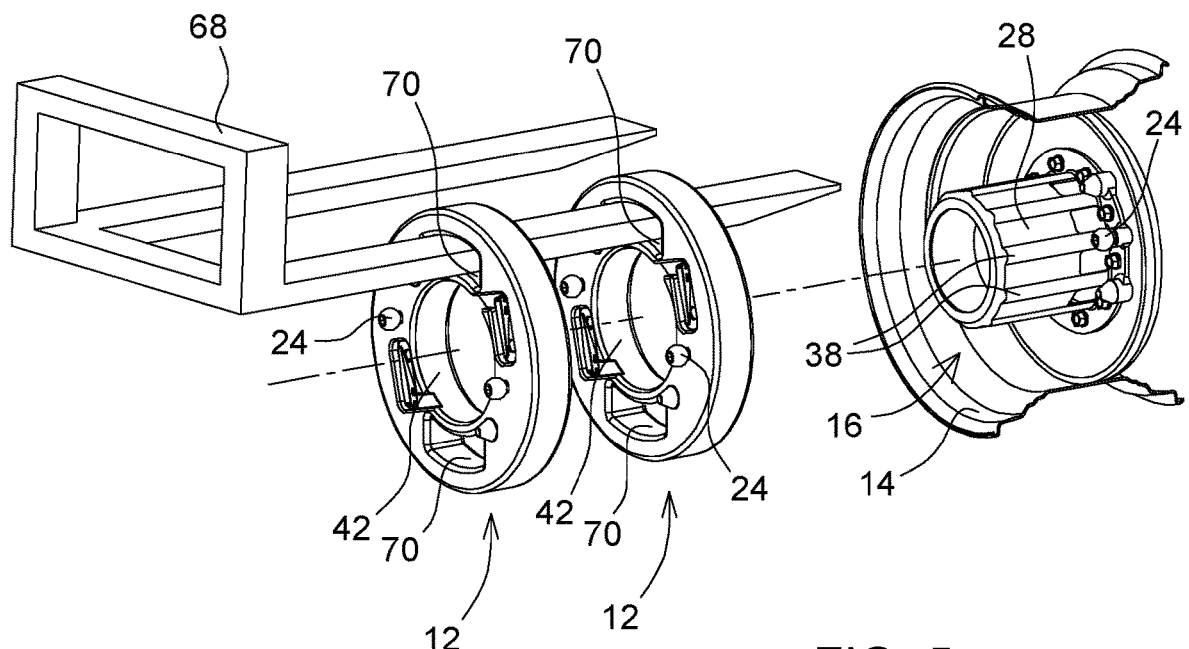
FIG. 5 is the add-on wheel weight shown in FIG. 1 in the case where multiple weight discs are being installed with the aid of a lift fork.

FIG. 5 shows the add-on wheel weight 10 during the installation of multiple weight discs 12 with the assistance of a loader fork 68, for which the weight discs 12 comprise coupling balls 24 for mounting additional weight discs 12.

The cutouts 70 for receiving the loader fork 68 or a cable hoist, not shown, are formed on the two weight discs 12. The loader fork 68 may be a front loader on an agricultural tractor (not shown). The weight discs 12 are raised until the central opening 42 provided in the weight discs 12 are aligned with the mounting 16 and thus allow the weight discs 12 to be pushed on without problems.

The weight discs 12 are removed in reverse order and this may likewise be accomplished with the assistance of a front loader after releasing the respective associated closure mechanism 18.

Figure 6:
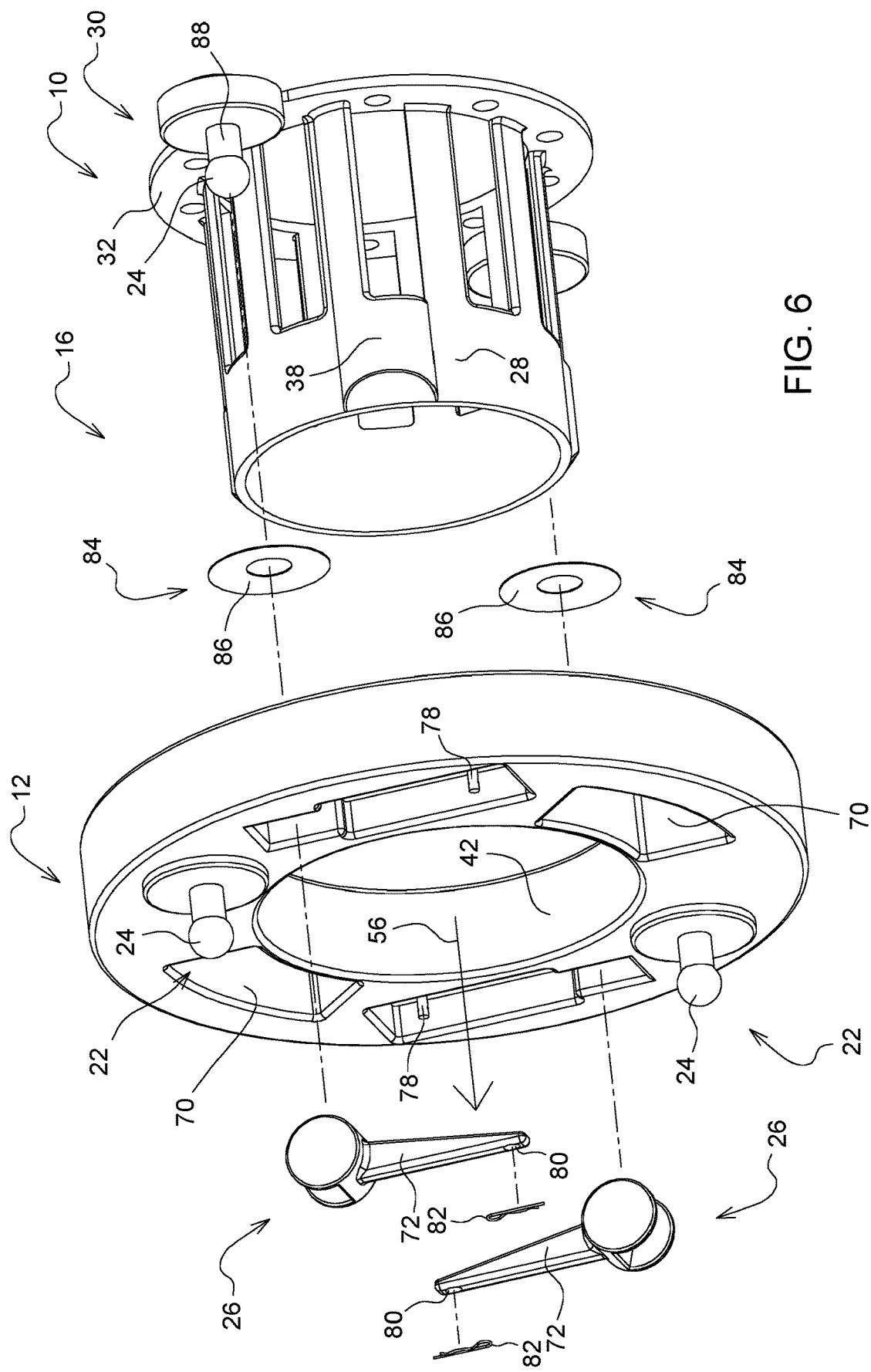
FIG. 6 is an exploded view of a second embodiment of the add-on wheel weight according to the disclosure, comprising a single weight disc and a mounting attachable to a wheel.
Figure 7:
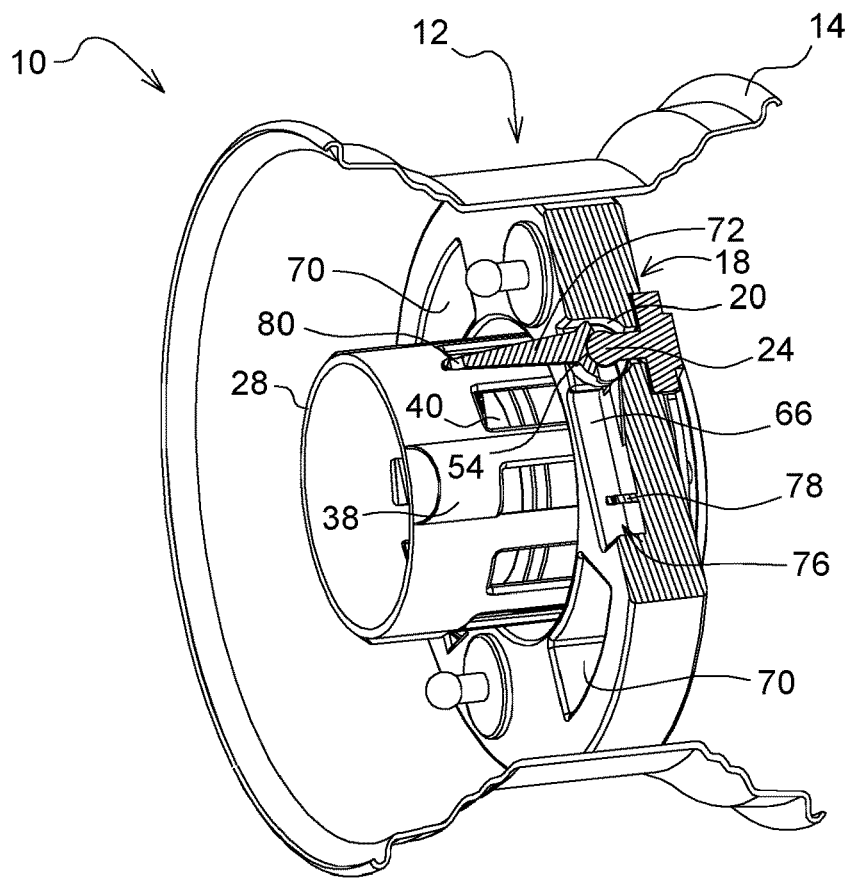
FIG. 7 is a cross-sectional representation of the add-on wheel weight shown in FIG. 6 during installation.

FIG. 6 shows an exploded view of a second embodiment of the add-on wheel weight according to the disclosure for an agricultural utility vehicle. The add-on wheel weight according to the disclosure will be described below with reference to the two cross-sectional representations according to FIG. 7 or FIG. 8.

The second embodiment differs from the first embodiment with respect to the design of the closure mechanism 18. In the locking element 26 provided, the blocking contour 54 may be formed directly on a pivotably mounted actuating lever 72. The blocking contour 54 may be oriented about a pivot axis 74 aligned with the center point of the coupling ball 24 located in the guide opening 20, when the coupling ball 24 is in the mounted position shown in FIG. 7 or FIG. 8.

Figure 9:
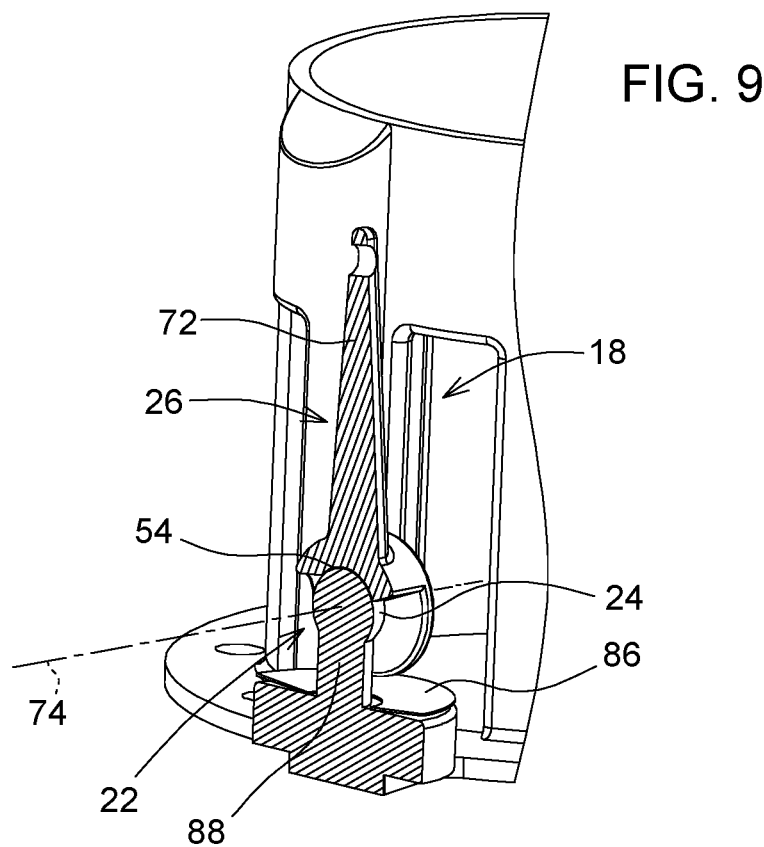
FIG. 9 is a cross-sectional view of the wheel closure mechanism, according to FIG. 6, in an unlocked position.
Figure 10:
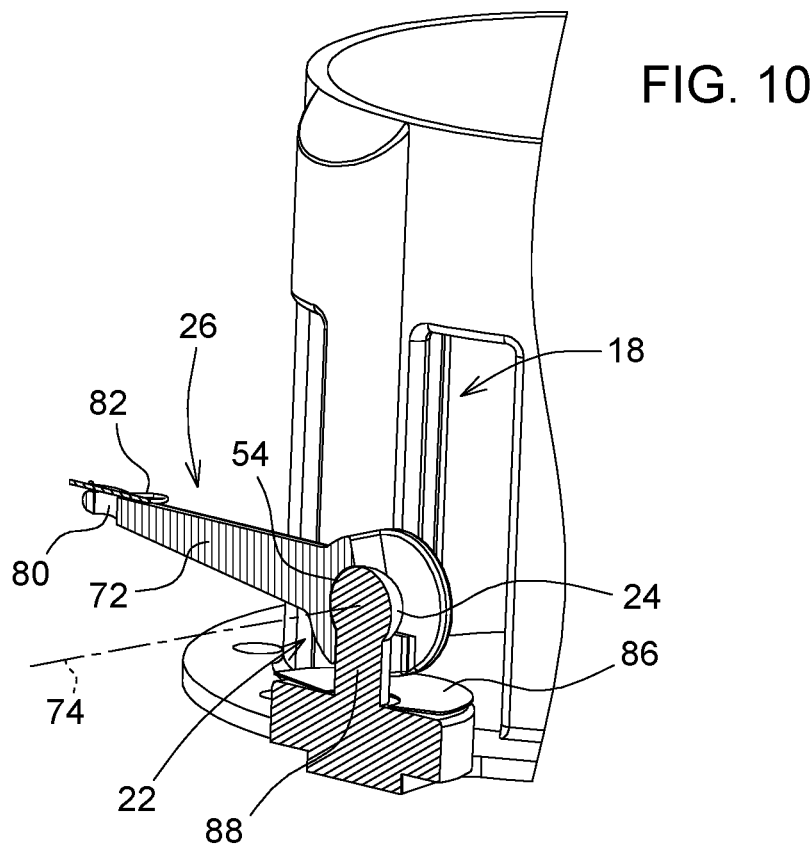
FIG. 10 is a cross-sectional view of the wheel closure mechanism, according to FIG. 6, in a locked position.

FIG. 9 and FIG. 10 show additional details with respect to the interaction between the coupling ball 24 and the actuating lever 72 with the blocking contour 54 formed thereon. Accordingly, the blocking contour 54 follows the spherical profile of the ball surface and may be pivoted back and forth along the surface by 90° between an unlocked position in FIG. 9 and a locked position in FIG. 10. The blocking contour 54 forms a contact surface for the coupling ball 24 in the guide opening 20, wherein the contact surface, at least in part, surrounds or reaches behind the coupling ball 24 in the removal direction 56 when the actuating lever 72 is in the locked position shown in FIG. 10.

Figure 8:
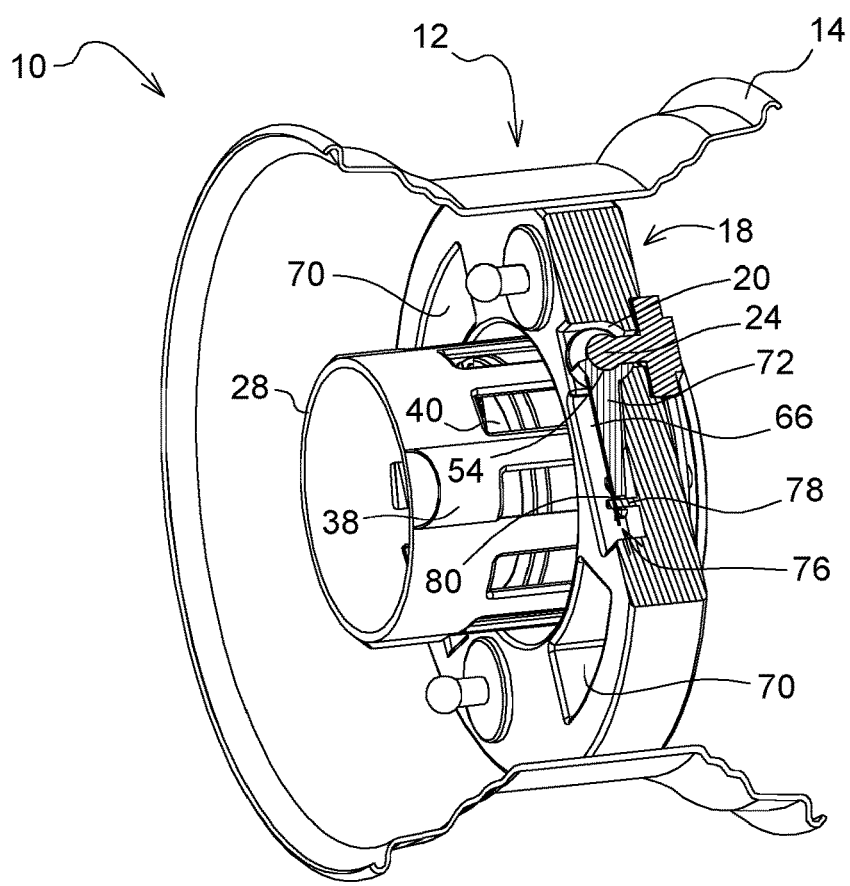
FIG. 8 is a cross-sectional view of the add-on wheel weight shown in FIG. 6 in the mounted state.

The blocking contour 54 may be sufficiently eccentric relative to the pivot axis 74 of the actuating lever 72 such that the coupling ball 24, in the locked position thereof shown in FIG. 8 and FIG. 10, may be clamped inside the guide opening 20.

In addition, a securing element 76 allows for releasable fixation of the actuating lever 72 in the locked position. The securing element 76 has a securing tab 78 formed on the weight disc 12, which extends through an opening 80 formed in the actuating lever 72 if the lever is in the locked position thereof shown in FIG. 8 or FIG. 10. A cotter pin 82 may be pushed through the securing tab 78 to secure the actuating lever 72, blocking it from swiveling out of the locked position.

A tensioning element 84 may be used for establishing a frictional connection between the mounting 16 and the weight disc 12. The tensioning element 84 may be designed in the form of a disc spring 86 arranged between the mounting 16 and the weight disc 12. The disc spring 86 may be pushed onto a fastening base 88 formed on the coupling ball 24. When the weight disc 12 is pushed on, the disc spring 86 may be compressed relative to the mounting 16, so that undesired driving-induced movements between weight disc 12 and mounting 16 are dampened.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An add-on wheel weight for a vehicle, comprising:
   a mounting configured to mount to a wheel, the mounting including a coupling element; and
   a weight disc configured to mount to the mounting, the weight disc including an actuatable closure mechanism, the closure mechanism having:
      an axially running guide opening configured to receive the coupling element; and
      a locking element configured to latch the coupling element inside of the guide opening when the closure mechanism is in a locked position, and to allow the coupling element to be released from the inside of the guide opening when the closure mechanism is in an unlocked position;

wherein the locking element includes a blocking contour that slides in and out of the guide opening, and the blocking contour latches the coupling element inside of the guide opening when the closure mechanism is in the locked position.

2. The add-on wheel weight of claim 1, wherein the closure mechanism is a first closure mechanism, and the weight disc includes a second closure mechanism that is spaced radially apart from the first closure mechanism.

3. An add-on wheel weight for a vehicle, comprising:
a mounting configured to mount to a wheel rim, the mounting including a coupling element; and
a weight disc configured to mount to the mounting, the weight disc including an actuatable closure mechanism, the closure mechanism having:
an axially running guide opening configured to receive the coupling element; and
a locking element configured to latch the coupling element inside of the guide opening when the closure mechanism is in a locked position, and to allow the coupling element to be released from the inside of the guide opening when the closure mechanism is in an unlocked position;
wherein the closure mechanism is a first closure mechanism, and the weight disc includes a second closure mechanism that is spaced radially apart from the first closure mechanism; and
wherein the weight disc includes a cutout that is configured to receive at least one of a loader fork and a cable hoist when mounting and unmounting the weight disc, and the cutout is positioned radially between the first and second closure mechanisms.

4. An add-on wheel weight for a vehicle, comprising:
a mounting configured to mount to a wheel, the mounting including a coupling element; and
a weight disc configured to mount to the mounting, the weight disc including an actuatable closure mechanism, the closure mechanism having:
an axially running guide opening configured to receive the coupling element; and
a locking element configured to latch the coupling element inside of the guide opening when the closure mechanism is in a locked position, and to allow the coupling element to be released from the inside of the guide opening when the closure mechanism is in an unlocked position; and
a tensioning element positioned between the mounting and the weight disc for establishing a frictional connection therebetween, the tensioning element being concentric with respect to the coupling element.

5. The add-on wheel weight of claim 4, wherein the tensioning element is a disc spring, an inner face of the disc spring contacts the coupling element, and an outer face of the disc spring contacts the weight disc.

6. An add-on wheel weight for a vehicle, comprising:
a mounting configured to mount to a wheel, the mounting including a coupling element; and
a weight disc configured to mount to the mounting, the weight disc including an actuatable closure mechanism, the closure mechanism having:
an axially running guide opening configured to receive the coupling element; and
a locking element configured to latch the coupling element inside of the guide opening when the closure mechanism is in a locked position, and to allow the coupling element to be released from the inside of the guide opening when the closure mechanism is in an unlocked position:
wherein the mounting includes an annular fastening flange and a hollow cylindrical main body coupled thereto and extending outwards relative to the vehicle, and an inner face of the annular fastening flange is configured to contact the wheel.

7. The add-on wheel weight of claim 6, wherein the weight disc includes a central opening, and the main body form-fittingly extends into the central opening.

8. The add-on wheel weight of claim 7, wherein the hollow cylindrical main body includes axially running sliding ribs, and the sliding ribs form-fittingly extend into the central opening.

9. The add-on wheel weight of claim 8, wherein the weight disc includes a bore that is canted relative to a central axis defined by the wheel weight, the locking element includes a return spring and a locking pin positioned in the bore, and the return spring biases the locking pin towards the guide opening.

10. The add-on wheel weight of claim 9, wherein the closure mechanism has an actuating lever, a first fastening pin that pivotably couples the actuating lever to the weight disc, and a second fastening pin that pivotably couples the actuating lever to the locking pin, and further wherein when the closure mechanism transitions from the unlocked position to the locked position and vice-versa, the actuating lever pivots relative to the weight disc about the first fastening pin, and the locking pin simultaneously pivots relative to the actuating lever about the second fastening pin.

11. The add-on wheel weight of claim 9, wherein the locking pin and the return spring define a snap closure, and the snap closure is biased to automatically latch the coupling element inside of the guide opening when the weight disc is slid onto the mounting.

12. The add-on wheel weight of claim 9, wherein when the closure mechanism is in the unlocked position, the locking pin does not block the coupling element from exiting the guide opening, and when the closure mechanism is in the locked position, the locking pin does block the coupling element from exiting the guide opening.

13. The add-on wheel weight of claim 9, wherein locking element is a pivotably mounted actuating lever.

14. The add-on wheel weight of claim 13, wherein the weight disc includes an outer face recess, and the actuating lever is positioned surface-flush in the outer face recess when the closure mechanism is in the locked position.

15. The add-on wheel weight of claim 13, wherein the coupling element includes a coupling ball, the locking element includes a blocking contour with a spherical profile that aligns with a center of the coupling ball when the closure mechanism is in the locked position.

16. The add-on wheel weight of claim 15, wherein the blocking contour rotates relative to a pivot axis of the actuating lever, such that the coupling ball is clamped inside the guide opening by the spherical profile when the closure mechanism is in the locked position.

* * * * *